(12) United States Patent
Chabah et al.

(10) Patent No.: US 6,310,575 B1
(45) Date of Patent: Oct. 30, 2001

(54) METHOD FOR THE DETECTION ESPECIALLY OF SMALL SEA TARGETS

(75) Inventors: Myriam Chabah; Gabriel Marchalot, both of Brest; Jean-Michel Quellec, Ploumoguer, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/458,815

(22) Filed: Dec. 10, 1999

(30) Foreign Application Priority Data

Dec. 11, 1998 (FR) .................................... 98 15698

(51) Int. Cl.$^7$ ...................................... G01S 13/52

(52) U.S. Cl. ...................... 342/162; 342/89; 342/91; 342/159; 342/160; 342/195; 342/196

(58) Field of Search ...................... 342/89–104, 159–164, 342/175, 192–197, 134–137, 26, 27, 28

(56) References Cited

U.S. PATENT DOCUMENTS

| | | |
|---|---|---|
| 3,883,877 | 5/1975 | Chabah, et al. . |
| 4,064,510 | 12/1977 | Chabah . |
| 4,103,300 | 7/1978 | Gendreu, et al. . |
| 4,719,463 | 1/1988 | Chabah . |
| 4,837,579 | 6/1989 | Pease, et al. . |
| 4,973,968 | * 11/1990 | Hurd .................... 342/137 |

FOREIGN PATENT DOCUMENTS

| | | | |
|---|---|---|---|
| 0187397-A1 | * 7/1986 | (EP) | ................. G01S/13/20 |
| 2 683 913 | 5/1993 | (FR) . | |

* cited by examiner

Primary Examiner—Bernarr E. Gregory
(74) Attorney, Agent, or Firm—Oblon, Spivak, McClelland, Maier & Neustadt, P.C.

(57) ABSTRACT

A method for the detection of a target by a radar in the presence of noise, the detection being performed on M antenna rotations, comprises at least: a first step for the estimation of the Doppler frequency ($\hat{f}$) of the target; a detection step, the target being detected if an associated variable Z is greater than or equal to a predetermined threshold S, the variable Z being defined according to the following relationship:

$$Z = \underset{t \in D_t, f \in D_f}{\text{MAX}} \left( \sum_{k=-N_d}^{N_d} \sum_{i=1}^{M-1} \frac{|C_{z,z_i}^k(t,f,G)|}{N(0,0,i,k)} + \sum_{k=-N_d}^{N_d} \sum_{l=-N_d}^{N_d} \sum_{i=1}^{M-1} \sum_{j=i+1}^{M-1} \frac{|C_{z_i^k,z_j^l}(t,f,G)|}{N(i,k,j,l)} \right)$$

$D_t$ being the time domain $[-t_0, t_0]$, $t_0$ being fixed as a function of the possible errors of framing of the signals from rotation to rotation; D being the frequency domain $[\hat{f}_d - f_0, \hat{f}_d + f_0]$, $f_0$ fixed as a function of the possible errors of estimation of the Doppler frequency; z being the signal at the analyzed antenna rotation referenced "0", at the analyzed range gate references "0"; $z_i^k$ being the signal obtained by tracking at the rotation i of the signal z, in taking account of the tracking error in any, i.e., offset by k range gates with respect to the estimated range gate; $C_{z,z_i}^k$ (t,f,G) being the Cohen transform of the signals z and $z_i^k$ with a kernel G, computed at the time t and the frequency f; $C_{z_i^k,z_j^l}$(t,f,G) being the Cohen transform of the signals $z_i^k$ and $z_j^l$ of the kernel G, computed at the time t and at the frequency f; $2N_d+1$ being the number of range gates taken into account, according to the tracking error if any; N(i, k, j, l) being a standardization.

7 Claims, 1 Drawing Sheet

METHOD FOR THE DETECTION ESPECIALLY OF SMALL SEA TARGETS

BACKGROUND OF THE INVENTION

1. Field of the Invention

The present invention relates to a method for the detection of a target by a radar in the presence of noise. It can be applied especially to the detection of small sea targets moving for example in a high sea clutter.

2. Description of the Prior Art

Sea patrol missions introduce specific conditions of detection. First of all, surveillance missions require 360° observation and extensive radar coverage. The radar antenna is therefore rotational and the angles of incidence are grazing so as to achieve radar ranges of more than 30 nautical miles for an altitude of about 2000 feet. Secondly, the detection is done in real time. This factor limits the available computation time and the complexity of the detection algorithm. Finally, and thirdly, the standard Doppler processing operations are often inoperative since the criterion of detection uses differences in speed between the target and the parasitic echoes, known as clutter, that are caused by the waves. Now clutter is mobile and targets such as safety boats can move according to the rhythm of the waves. Thus detection processing operations are generally done on incoherent signals.

For these reasons, the processing operations implemented in the context of sea patrols consist of a filtering adapted to incoherent signals. In particular, they cannot perform any processing or phases and use simply the energy level of the back-scattered signal to distinguish between the signals returned from the target and the signals returned from the clutter. The anti-clutter means developed thus seek to increase the signal-to-clutter ratio by reducing the size of the resolution cell. To this end, a pulse compression is performed to obtain a resolution of about 1 meter for example and the width of the antenna lobe of the radar is reduced so as to obtain a width at 3 dB of about 1°. In the context of sea patrols, the detection devices take account of the period of correlation of sea clutter by setting up a criterion of rotation-by-rotation integration known as an N/M type integration. According to a criterion of this kind, a target is assumed to exist if a corresponding echo has been detected at least a given number N of times on each of a number M of rotations. The rotation speed of the antenna thus becomes a key factor in the detection. If this speed is great, the number of rotations during which the target can be detected is large but, on the other hand, the target is rapidly scanned by the antenna lobe during one rotation. The decorrelation of the clutter, rotation by rotation, is then low. To favor the detection on each rotation, it is therefore necessary to reduce the rotation speed, but the number of detection opportunities is then reduced. At present, both alternatives are used. There are therefore sea patrol radars with high antenna rotation speeds of about 200 rotations per minute and sea patrols with a moderate antenna rotation speed of about 30 rotations per minute.

However, the processing operations presently implemented do not make it possible to meet the increasingly stringent requirements laid down for sea patrols. Detection operations are henceforth expected do be done in increasingly rough seas, for example under force 4 and force 5 wind conditions for targets with increasingly small radar cross-section values, for example 1 $m^2$ to 5 $m^2$, and hence for increasingly small useful signal-to-clutter ratios. Furthermore, the required probabilities of false alarms may be in the range of $10^{-5}$ to $10^{-6}$. This appreciably corresponds to the bit rate that a radar operator can handle without being overwhelmed by the number of echo blips. A threshold level corresponding to these false-alarm rates is difficult to reconcile with a standard detection of small targets which produces a far greater false-alarm rate.

Apart from the fact that it is necessary to work at increasingly small signal-to-clutter ratios, the very nature of clutter at high resolution, at grazing angles of incidence and for stormy seas, is changing and itself increasing the severity of the conditions of detection. Thus, the differences between the signals back-scattered by the clutter and by a localized target are attenuated. To demarcate the problem of this detection more clearly, we may examine a simple modeling of back-scattering on the surface of the sea by inclined planes on which there are superimposed a surface with low roughness, i.e. with a small peak-to-valley height, for example equal to the radar wavelength. At these values of incidence close to the vertical or when there is poor resolution, the roughness is wiped out. It then plays a small role in the back-scattering phenomenon which depends essentially on the slope of the tangential plane. It can easily be seen that when the radar incidence becomes flat and when the resolution improves, the roughness becomes a decisive factor in back-scattering. This results in effects of masking and multiple paths that are expressed physically in the appearance of spikes that get detached from the background of low level clutter. When a test is made on the power of the signal, these spikes go beyond the detection threshold and activate false alarms. It can also be seen that these spikes are related to the breaking waves.

Certain known results make it possible to improve the detection algorithms. In particular, there is a known way by which the analysis of the incoherent signal shows that the strong echoes lengthen the distribution tail of the amplitude of sea clutter which is often represented by relationship K. More generally, the sea clutter is no longer modeled statistically by a process distributed according to a Gaussian law but rather by a compound Gaussian process, namely a Gaussian process multiplied by a random variable. A process according to a relationship K is a particular compound Gaussian process. There are also known ways wherein the analysis of a complex signal reveals that the band length of the clutter increases with the appearance of the above-mentioned spikes because the diversity of the speed of the reflecting particles related to the breaking of the waves, such as spray for example, widens the Doppler spectrum. It is also known that the Doppler signature of the breaking waves is characteristic of the appearance of fast reflectors. The reflecting structures located at a peak of the wave about to break acquires its high phase speed and then slows down in the course of time. Finally, it is known that the waves are amplitude-modulated and break when a peak passes through the maximum modulation that corresponds to the point of maximum instability. The shift in the breaking waves is therefore linked to the relative speed of the peaks with relation to the modulation while the Doppler frequency of the clutter reflects the speed of the peaks only. Thus, unlike localized targets with a low-fluctuation Doppler frequency, the tracking of a spike by the estimation of its Doppler frequency is inappropriate.

The limitations of the standard processing methods are therefore of several kinds. Among them:

the standard detection algorithms based on matched filtering, which result in a correlation and then a detection of an envelope, are optimum in Gaussian noise whereas the clutter is better represented by a compound Gaussian process;

the incoherent detection does not enable any distinction between the target and the spikes for localized targets with a radar cross-section, and coherent detection seems to be better indicated when there are spikes and breaking waves since the energy is concentrated on a limited band of frequencies in the case of a localized target and is dispersed over a wider band in the case of breaking waves;

the value of rotation-by-rotation integration as practised is limited because the size of the resolution cell is increased by carrying out groupings in distance, especially for problems of sizes of memory. The probability of the presence and detection of a spike without even taking account of its period of existence in a widened zone is then increased and the criterion of N/M detection suffers loss of effectiveness. The rotation-by-rotation integration makes only superficial use, in the form of a binary test for the presence or absence of a strong echo, of the fastest decorrelation of the sea clutter from rotation to rotation. It does not play a role especially in the values of changes in frequency. This binary aspect causes a deterioration in the information contained in the N rotations that corresponds to the presence of the target.

SUMMARY OF THE INVENTION

An aim of the invention especially is to overcome these different limits by making the detection processing operation comprehensively cover all the rotations during which the target is likely to be present, and more particularly by combining the signals of the different rotations at the elementary resolution cells. In fact, one aim of the invention is to enable the detection of a target, especially a small-sized sea target, in the presence of a high level of clutter, with the lowest possible rate of false alarms, especially a rate compatible with operational requirements. To this end, the invention gives general scope to the <<envelope correlator-detector >> principle by extending it to the time-frequency domain so as to benefit from the frequency dispersion of the sea echoes and by using all the rotations aimed at detecting the target. More particularly, an object of the invention is a method for the detection of a target by a radar in the presence of noise, the detection being performed on M antenna rotations, wherein it comprises at least:

a first step for the estimation of the Doppler frequency ($\hat{f}_d$) of the target;

a detection step, the target being detected if an associated variable Z is greater than or equal to a predetermined threshold S, the variable Z being defined according to the following relationship:

$$Z = \underset{t \in D_t, f \in D_f}{\text{Max}} \left( \sum_{k=-N_d}^{N_d} \sum_{i=1}^{M-1} \frac{|C_{z,z_i^k}(t,f,G)|}{N(0,0,i,k)} + \sum_{k=-N_d}^{N_d} \sum_{l=-N_d}^{N_d} \sum_{i=1}^{M-1} \sum_{j=i+1}^{M-1} \frac{|C_{z_i^k,z_j^l}(t,f,G)|}{N(i,k,j,l)} \right)$$

$D_t$ being the time domain $[-t_0, t_0]$, $t_0$ being fixed as a function of the possible errors of framing of the signals from rotation to rotation;

$D_f$ being the frequency domain $[\hat{f}_d - f_0, \hat{f}_d + f_0]$, $f_0$ being fixed as a function of the possible errors of estimation of the Doppler frequency;

z being the signal of the analyzed antenna rotation referenced "0" at the analyzed range gate referenced "0";

$z_i^k$ being the signal obtained by tracking at the rotation i of the signal z, in taking account of the tracking error if any, i.e. offset by k range gates with respect to the estimated range gate;

$C_{z,z_i^k}(t,f,G)$ being the Cohen transform of the signals z and $z_i^k$ with a kernel G, computed at the time t and the frequency f;

$C_{z_i^k,z_j^l}(t,f,G)$ being the Cohen transform of the signals $z_i^k$ and $z_j^l$ of the kernel G, computed at the time t and at the frequency f;

$2N_d+1$ being the number of range gates taken into account, according to the tracking error, if any;

N(i, k, j, l) being a standardization.

The main advantages of the invention are that it does not require special computation capacities, can be adapted to existing equipment and is economical.

BRIEF DESCRIPTION OF THE DRAWINGS

Other features and advantages of the invention shall appear from the following description, made with reference to the appended drawings of which.

MORE DETAILED DESCRIPTION

Figure 1:
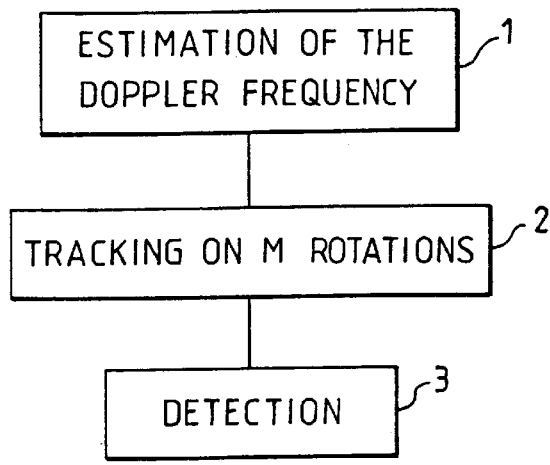
FIG. 1 is a presentation of possible steps of the method according to the invention.

FIG. 1 shows the different possible steps of the method according to the invention. The method comprises a first step 1 for the estimation of the Doppler frequency. In this step, the Doppler frequency is estimated for each candidate target of an analyzed antenna rotation, namely for each antenna lobe, according to the known criterion of generalized maximum likelihood. The clutter is supposed to be white, namely this first step may follow a possible step of whitening of the clutter. It is assumed in this case that this possible step has had little effect on the shape of the echo of a target x(t) defined by the following relationship (1):

$$x(t) = \alpha s(t) \qquad (1)$$

where α is an unknown complex parameter and s(t) verifies the following relationship:

$$s(t) = a(t) e^{j2\pi F_d t} \qquad (2)$$

$F_d$ being the unknown complex frequency, a(t) being a known real vector that modulates the amplitude of the target and t representing time.

If we consider the sampled values, namely considering t to be equal to $nT_e$, where $T_e$ is the sampling period and therefore t is still equal to $n/F_R$, where $F_R$ is the recurrence frequency of the radar signal and n varies from 0 to N−1, it follows that the sampled signal x(n), which represents one of the N cases of presence of targets during an antenna rotation, may again be expressed according to the following relationship:

$$s(n) = a(n)e^{j2\pi F_d \frac{n}{F_R}} \quad (3)$$

In short, in one of the M antenna rotations, a target echo may be represented by a sequence of N samples as expressed by the relationship (3), not taking account of the coefficient α of the relationship (1).

The sea clutter is for example modeled by a compound Gaussian vector referenced c(n) and defined according to the following sample:

$$c(n) = u\, g(n) \quad (4)$$

where u is a non-negative random variable and g is a random Gaussian vector.

It is assumed that a sampled echo z(n) can be determined according to the following two hypotheses $H_0$, $H_1$:

$$H_0: z(n) = c(n) \quad (5)$$

an assumption that corresponds to the case where the echo contains only clutter:

$$H_1: z(n) = x(n) + c(n) \quad (5)$$

a hypothesis that corresponds to the case where the sampled echo z(n) comprises an echo of the clutter c(n) but also the target echo x(n).

An article by E. Conte, M. Lops and G. Ricci "Asymptotically Optimum Radar Detection In Compound-Gaussian Clutter" (IEEE Trans. Electron. Syst., Vol. 31, No. 2, April 1995, pages 617–625) shows that the estimation of the Doppler frequency of the target in compound Gaussian noise obtained by the criterion of the generalized maximum likelihood referenced $\hat{f}_d$ is given by the following synthetic relationship:

$$\hat{f}_d = \mathrm{ArgMax}_{f_d}(s^H z) \quad (6)$$

which means, when formulated in condensed form, that $\hat{f}_d$ is the argument that maximizes the module of $s^H z$. The exponent "H" means that the vector is transposed and conjugate. In resuming the non-sampled formulation of the signals, what has to be done in order to obtain $\hat{f}_d$ is to select the frequency f that maximizes the variable M(f) defined according to the following relationship:

$$M(f) = |\int z(t) a(t)^* e^{-j2\pi f t} dt| \quad (7)$$

z(t) is the echo received as a function of the time of the first antenna rotation considered. This sign * as an exponent expresses the fact that it is the conjugate variable that is taken into account. The integral of the relationship (7) is computed on the duration of the signals, namely between the initial instant $t_0$ and the instant $t_0 + (N-1)T_e$, where $T_e$ is the sampling period. The integrals presented hereinafter, with their formal expression deprived of bounds, are computed on the duration of the signals.

In practice, the Doppler frequency is therefore estimated by forming the speed channels by Fourier transform of the echo z(n), weighted by a window defined by the conjugate of a(n) and by selecting the most energy-filled channel.

The method according to the invention comprises for example a second step 2 of tracking on M rotations, M being the above-mentioned, predetermined number of antenna rotations. This step is placed in the context of the above assumption $H_1$ and determined the resolution cells in which the target is located during the M rotations, it being furthermore assumed that its Doppler frequency fluctuates little from one rotation to another.

Figure 2:
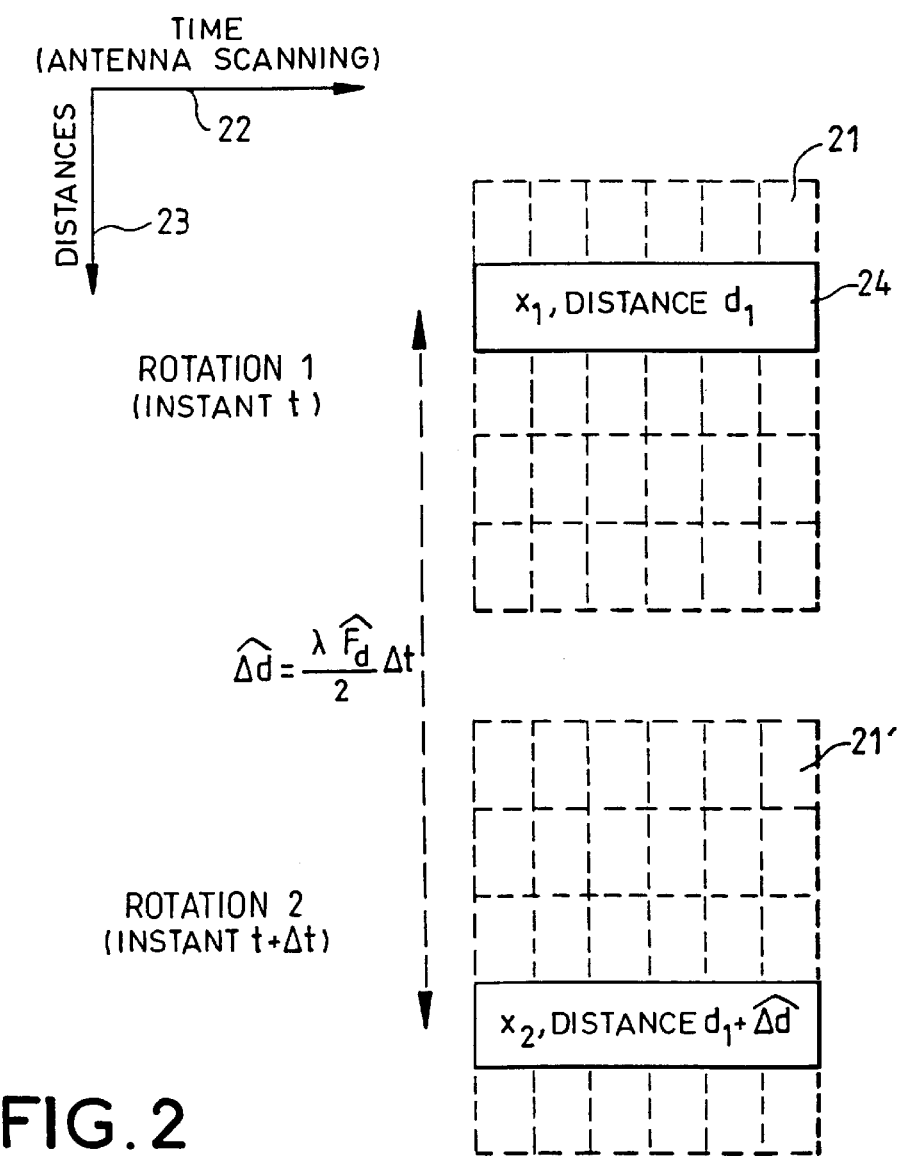
FIG. 2 is an illustration of the second step of the method according to the invention, where the number of antenna rotations on which the detection is based is equal to two, this figure especially having resolution cells at the first rotation, at an instant t, and at the second rotation, at an instant t+Δt.

FIG. 2 illustrates this second step for an example where M=2. This figure in particular shows resolution cells 21, 21' at the first rotation, at an instant t, and at the second rotation at an instant t+Δt. These resolution cells, in distance and in time, extend along a time axis 22, linked to the scanning of the antenna, and a distance axis 23. The radial shift of a target is deduced from the estimation of its Doppler frequency $\hat{f}_d$. Thus, at the first rotation, an echo $x_1$ coming from a target located at the distance $d_1$ from the radar occupies a set 24 of resolution cells at the same distance $d_1$. With each cell, there is associated a sample $x_1(n)$ of the echo, namely a cell corresponding to a radar recurrence. At the second rotation, the echo $x_2$ coming from the same target indicates that this target is at a distance $$d_2 = d_1 + \frac{\lambda \hat{f}_d}{2} \Delta t,$$

where Δt represents the time that has elapsed between the two rotations and λ is the wavelength of the radar. The Doppler frequency $\hat{f}_d$ is estimated according to the first step 1.

If we generalize to M rotations, the estimated shift of the target in the first rotation referenced 0 and an i order rotation, i ranging from 1 to M, is given by the following relationship:

$$\hat{\Delta d_i} = \frac{\lambda \hat{f}_d}{2} i \Delta t \quad (8)$$

where $\hat{\Delta d_i}$ is the estimation of the shift of the target during the time iΔt corresponding to the duration of i rotations and $\hat{f}_d$ is the estimated frequency according to the first step 1 of the method according to the invention. Given the low resolution in azimuth of about a few hundreds of meters when a detection is made on a remote zone that is at a distance of about ten kilometers, it is legitimate to overlook the azimuth shift on the M rotations.

Each elementary cell 21 of the first rotation is connected to M−1 cells 21' of the following rotations. The article by Conte et al. mentioned here above as well as an article by F. Gini, "Sub-Optimum Coherent Radar Detection In A Mixture of K-distributes And Gaussian Clutter", IEEE Proc.—Radar Sonar Navig., Vol.144, No. 1, February 1997, pages 39–48, have shown the value of a detector obtained by comparing the variable y defined by the following relationship (9) with a threshold determined by the probability of a desired false alarm:

$$y = \frac{|s^H z|^2}{(s^H s)(z^H z)} \quad (9)$$

The product $(s^H s)$ being independent of the observation of z, an equivalent detector is obtained by comparing the variable y' defined here below by the relationship (10) with a threshold determined by the desired false-alarm probability:

$$y' = \frac{|s^H z|^2}{(z^H z)} \tag{10}$$

According to the invention, this detector is generalized on the M antenna rotations. This generalization is the object of a third step of detection of the target. In this step, the invention especially exploits the fact that there is a frequency decorrelation of the above-mentioned spikes. In other words, the invention exploits the fact that the frequency of a spike signal received is different from one rotation to another. To this end, the different variables $y_i'$ defined by the following relationship (11) are combined:

$$y_i' = \frac{|s^H z_i|^2}{(z_i^H z_i)} \tag{11}$$

$z_i$ being the signal received at the i order antenna rotation, selected in the second step by the tracking of the echo z of the first antenna rotation. i varies from 0 to M−1, i=0 corresponding to the first antenna rotation. A comparison with a threshold S is done on a variable T defined according to the following relationship:

$$T = \sum_{i=0}^{M-1} \sum_{j=i+1}^{M-1} \sqrt{y_i' y_j'} \tag{12}$$

and according to the relationship (12) we get:

$$T = \sum_{i=0}^{M-1} \sum_{j=i+1}^{M-1} \frac{|s^H z_i||s^H z_j|}{\sqrt{(z_i^H z_i)(z_j^H z_j)}} \tag{13}$$

The product of the moduli $|s^H z_i||s^H z_j|$ is expressed as a function of the unsampled signals s by the following relationship:

$$|s^H z_i||s^H z_j| = |(s^H z_i)(s^H z_j)^*| = |(\int z_i(t)s(t)^* dt)(\int z_j(t)s(t)^* dt)^*| \tag{14}$$

An interpretation of this relationship is possible by means of Moyal's generalized formula (J. E. Moyal—Quantum Mechanics As A Statistical Theory, Proc. Cambridge Phil. Soc., Vol.45, 1949, pages 99–124),:

$$(\int z_i(t)s(t)^* dt)(\int z_j(t)s(t)^* dt)^* = \iint W_{z_i,z_j}(t,v) W_{s,s}(t,v)^* dt \tag{15}$$

where $W_{z_i,z_j}(t,v)$ is the Wigner-Ville crossed transform of the echoes $z_i(t)$ and $z_j(t)$ received respectively at the rotations i and j. This transform, which is a function of the time t and the frequency v, is given by the following relationship, the variable τ expressing a delay:

$$W_{z_i,z_j}(t, v) = \int z_i\left(t+\frac{\tau}{2}\right) z_j\left(t-\frac{\tau}{2}\right)^* e^{-j2\pi v\tau} d\tau \tag{16}$$

Furthermore, taking the Cohen transform of the signals $z_i(t)$ and $z_j(t)$ referenced $C_{z_i,z_j}(t,v,G)$ which is the Wigner-Ville transform filtered in time t at a frequency v by the reverse Fourier transform g(t, v) with a kernel G.

The Cohen transform $C_{z_i,z_j}(t,v,G)$ is thus defined according to the following relationship:

$$C_{z_i,z_j}(t,v,G) = \iint g(\delta-t, \epsilon-v) W_{z_i,z_j}(\delta,\epsilon) d\delta d\epsilon \tag{17}$$

where:

$$g(t,v) = \iint G(\epsilon,\tau) e^{j2\pi(v\tau+\epsilon t)} d\epsilon d\tau \tag{18}$$

Using the definition of the Cohen transform with the kernel $G = A^*_{s,s}$, where $A_{s,s}$ is the radar ambiguity function, this function being the reverse Fourier transform of $W_{s,s}$, we get for t=0, and for v=0:

$C_{z_i,z_j}(0,0,A^*_{s,s}) = \iint g(\delta,\epsilon) W_{z_i,z_j}(\delta,\epsilon) d\delta d\epsilon$ according to the relationship (17) and:

$g(t,v) = W^*_{s,s}(t,v) = \iint A^*_{s,s}(\epsilon,\tau) e^{j2\pi(v\tau+\epsilon t)} d\epsilon d\tau$ according to the relationship (18).

Finally, the Cohen transform of the signals $z_i(t)$ and $z_j(t)$ as a function of the kernel $A^*_{s,s}$, for t=0 and v=0 verifies the following relationship:

$$C_{z_i,z_j}(0,0,A^*_{s,s}) = \iint W_{z_i,z_j}(\delta,\epsilon) W^*_{s,s}(\delta,\epsilon) d\delta d\epsilon \tag{19}$$

and according to Moyal's formula of the relationship (15), we get:

$$(\int z_i(t)s_i(t)^* dt)(\int z_j(t)s_j(t)^* dt)^* = |C_{z_i,z_j}(0,0,A^*_{s,s})| \tag{20}$$

The product $|s^H z_i||s^H z_j|$ is therefore identified with $|C_{z_i,z_j}(0,0,A^*_{s,s})|$. The variable T of the test, set up according to the relationship (13), can therefore be written as follows:

$$T = \sum_{i=0}^{M-1} \sum_{j=i+1}^{M-1} \frac{|C_{z_i,z_j}(0, 0, A^*_{s,s})|}{\sqrt{(z_i^H z_i)(z_j^H z_j)}} \tag{21}$$

The signal s being expressed according to the relationship (2), we get according to the relationships (17) and (18):

$$C_{z_i,z_j}(0,0,A^*_{s,s}) = C_{z_i,z_j}(0,F_d,|A_{s,s}|) \tag{22}$$

The variable T is then expressed according to the following relationship in taking not the real Doppler frequency but its estimate $\hat{f}_d$:

$$T = \sum_{i=0}^{M-1} \sum_{j=i+1}^{M-1} \frac{|C_{z_i,z_j}(0, \hat{f}_d, |A_{s,s}|)|}{\sqrt{(z_i^H z_i)(z_j^H z_j)}} \tag{23}$$

A target is detected if this variable T that is associated with it is greater than or equal to a predetermined threshold S.

It can thus be seen that the envelope correlator-detector is modified so as to introduce, apart from the correlation between the signal and the target, the correlation of the signal at the rotation i with the signal at the rotation j. Indeed, the Wigner-Ville transform $W_{z_i,z_j}(t,\hat{f}_d)$ measures the correlation between the rotation i and j, and then the filtering by the kernel $A^*_{s,s}$ is expressed by the correlation with the Wigner-Ville transform of the expected target signal, as can be seen in the relationship (19). This formalism enables the processing to be matched with the information available on the target. If the amplitude modulation a(n) of the target is unknown, it is possible to replace the kernel $A^*_{s,s}$ by a kernel G used conventionally in the Cohen transforms. Its shape may for example be adjusted so as to attenuate the level of the Cohen transform of two signals $z_i$ and $z_j$ with distant Doppler frequencies, namely in fact by attenuating the modulus $|C_{z_i,z_j}(0, \hat{f}_d, G)|$. This is a means of eliminating the echoes of sea clutter decorrelated in frequency between two rotations.

The size of the distance-time-frequency zone on which the test on the variable T is performed depends on the quality of the estimation of the Doppler frequency $\hat{f}_d$ and the tracking of the target. Thus, in order to take account of possible tracking errors, it is possible to include, in the combination of the test on the variable T, the echoes from the range gates adjacent to the initially tracked range gates. Furthermore, in order to guard against temporal or frequency shifts between the target signals at the rotations i and j, it is possible for example to take the decision in the time-frequency plane on a widened domain.

The detection is done on a variable Z. The target is detected if Z is greater than or equal to a determined threshold as a function of the desired false alarm, the variable Z being defined according to the following relationship (24):

$$Z = \underset{t \in D_t, f \in D_f}{\text{Max}} \left( \sum_{k=-N_d}^{N_d} \sum_{i=1}^{M-1} \frac{|C_{z,z_i^k}(t,f,G)|}{N(0,0,i,k)} + \sum_{k=-N_d}^{N_d} \sum_{l=-N_d}^{N_d} \sum_{i=1}^{M-1} \sum_{j=i+1}^{M-1} \frac{|C_{z_i^k, z_j^l}(t,f,G)|}{N(i,k,j,l)} \right)$$

The relationship (24) expresses the fact that Z is the maximum considered for all the periods of time t included in the range $D_t$ and for all the frequencies f included in the domain $D_f$.

$D_t$ is the time domain $[-t_0, t_0]$, $t_0$ being fixed as a function of the possible errors of framing of the signals from rotation to rotation.

$D_f$ is the frequency domain $[\hat{f}_d - f_0, \hat{f}_d + f_0]$, $f_0$ being fixed as a function of the possible errors of estimation of the Doppler frequency.

z is the signal at the analyzed antenna rotation referenced "0" at the analyzed range gate referenced "0".

$z_i^k$ is the signal obtained by tracking at the rotation i of the signal z in taking account of possible tracking error, namely shifted by k range gates with respect to the estimated range gate, $z_i^k$ is for example obtained during the second tracking step. The signals z and $z_i^k$ are possibly whitened.

$C_{z_i^k, z_j^l}(t,f,G)$ is the Cohen transform of the signals $z_i^k$ and $z_j^l$ with kernel G computed in time t and at the frequency f, $C_{z, z_i^k}(t, f, G)$ being the Cohen transform of the signals z and $z_i^k$ with a kernel G computed at the time and the frequency f.

The kernel G may be identified at $|A^*_{s,s}|$ or else the kernel may correspond to a kernel conventionally used in the Cohen transforms adjusted so as to attenuate the level of the Cohen transforms of two signals $z_i^k$ and $z_j^l$ of distant Doppler frequencies.

$2N_d$ is the number of range gates taken into account according to the possible tracking error.

N(i, k, j, l) is a possible standardization.

This standardization is therefore for example equal to 1, namely N(i, k, j, l)=N(0,0, j, l)=1, which actually means that it is inoperative or else that it may be defined for example by:

$$N(i,k,j,l) = \sqrt{\int z_i^k(t) z_i^k(t)^* dt \int z_j^l(t) z_j^l(t)^* dt}$$

and $$N(0,0,j,l) = \sqrt{\int z(t) z(t)^* dt \int z_j^l(t) z_j^l(t)^* dt}$$

The method according to the invention does not require special computation capacities. The steps of the method according to the invention may indeed be stored and processed in standard digital circuits provided that these circuits have appropriate response times. The invention may be implemented in particular on already existing equipment without any substantial addition of equipment. The result of the foregoing also that the invention is economical.

The invention has been described for the detection of a sea target in the presence of a high level of sea clutter. However, it may be applied to the detection of other targets provided especially that there is little variation in the Doppler frequency of the target.

What is claimed is:

1. A method for the detection of a target by a radar in the presence of noise, the detection being performed on M antenna rotations, wherein it comprises at least:

a first step for the estimation of the Doppler frequency ($\hat{f}_d$) of the target;

a detection step, the target being detected if an associated variable Z is greater than or equal to a predetermined threshold S, the variable Z being defined according to the following relationship:

$$Z = \underset{t \in D_t, f \in D_f}{\text{Max}} \left( \sum_{k=-N_d}^{N_d} \sum_{i=1}^{M-1} \frac{|C_{z,z_i^k}(t,f,G)|}{N(0,0,i,k)} + \sum_{k=-N_d}^{N_d} \sum_{l=-N_d}^{N_d} \sum_{i=1}^{M-1} \sum_{j=i+1}^{M-1} \frac{|C_{z_i^k, z_j^l}(t,f,G)|}{N(i,k,j,l)} \right)$$

$D_t$ being the time domain $[-t_0, t_0]$, $t_0$ being fixed as a function of the possible errors of framing of the signals from rotation to rotation;

$D_f$ being the frequency domain $[\hat{f}_d - f_0, \hat{f}_d + f_0]$, $f_0$ being fixed as a function of the possible errors of estimation of the Doppler frequency;

z being the signal at the analyzed antenna rotation referenced "0", at the analyzed range gate referenced "0";

$z_i^k$ being the signal obtained by tracking at the rotation i of the signal z, in taking account of the tracking error if any, i.e. offset by k range gates with respect to the estimated range gate;

$C_{z,z_i^k}(t,f,G)$ being the Cohen transform of the signals z and $z_i^k$ with a kernel G, computed at the time t and the frequency f;

$C_{z_i^k, z_j^l}(t,f,G)$ being the Cohen transform of the signals $z_i^k$ and $z_j^l$ of the kernel G, computed at the time t and at the frequency f;

$2N_d+1$ being the number of range gates taken into account, according to the tracking error if any;

N(i, k, j, l) being a standardization.

2. A method according to claim 1, wherein the kernel of the Cohen transform $|A_{s,s}|$ is the modulus of the ambiguity function of the radar.

3. A method according to claim 1, wherein the estimated Doppler frequency $\hat{f}_d$ is the argument that maximizes the variable M(f) defined according to the following relationship:

$$M(f) = |\int z(t) a(t)^* e^{-j2\pi f t} dt|$$

where z(t) is the echo from the target received, as a function of the time, at the first antenna rotation considered and where a*(t) is the conjugate of a real vector that modulates the amplitude of the target.

4. A method according to claim 1, comprising a tracking step following the first step on the M rotations to determine the resolution cells in which the target is located during the M rotations.

5. A method according to claim 1, wherein the first step is preceded by a step for the whitening of the noise.

6. A method according to claim 1, wherein the standardization N (i, k, j, l) is equal to 1.

7. A method according to claim 1, wherein the target is a target at sea in the presence of sea clutter.

* * * * *